US009535414B2

(12) United States Patent
Wilke et al.

(10) Patent No.: US 9,535,414 B2
(45) Date of Patent: Jan. 3, 2017

(54) SYSTEM AND METHOD FOR DISTRIBUTING AND EXCHANGING ELEMENTS FOR PLANNING AND/OR FOR OPERATING AUTOMATION OPERATING EQUIPMENT

(71) Applicant: ABB Technology AG, Zürich (CH)

(72) Inventors: Kay Wilke, Hamburg (DE); Georg Gutermuth, Heidelberg (DE); Volker Jung, Weisenheim am Sand (DE); Rainer Drath, Seckenheim (DE)

(73) Assignee: ABB Schweiz AG, Baden (CH)

( * ) Notice: Subject to any disclaimer, the term of this patent is extended or adjusted under 35 U.S.C. 154(b) by 589 days.

(21) Appl. No.: 13/741,762

(22) Filed: Jan. 15, 2013

(65) Prior Publication Data

US 2014/0200688 A1    Jul. 17, 2014

(51) Int. Cl.
G05B 19/042    (2006.01)

(52) U.S. Cl.
CPC . *G05B 19/0426* (2013.01); *G05B 2219/23261* (2013.01)

(58) Field of Classification Search
None
See application file for complete search history.

(56) References Cited

U.S. PATENT DOCUMENTS

| 2003/0093187 A1* | 5/2003 | Walker ............ B64C 13/20 701/1 |
| 2005/0021156 A1* | 1/2005 | Kay et al. ............ 700/18 |
| 2006/0047798 A1* | 3/2006 | Feinleib et al. ............ 709/223 |
| 2008/0052674 A1 | 2/2008 | Little |
| 2009/0077055 A1* | 3/2009 | Dillon et al. ............ 707/5 |
| 2010/0274385 A1 | 10/2010 | Eriksson |

FOREIGN PATENT DOCUMENTS

| DE | 10 2005 058 801 A1 | 6/2007 |
| WO | WO 2009/089914 A1 | 7/2009 |

OTHER PUBLICATIONS

International Search Report (PCT/ISA/210) issued on Jun. 7, 2011, by the European Patent Office as the International Searching Authority for International Application No. PCT/EP2010/004602. Chapter 1 Introduction 1995 XP-002172681. (31 pages).

* cited by examiner

*Primary Examiner* — Mohammad Ali
*Assistant Examiner* — Saad M Kabir
(74) *Attorney, Agent, or Firm* — Barnes & Thornburg LLP

(57) ABSTRACT

A system and method are disclosed for distributing and exchanging elements for planning and/or operating automation operating equipment, which include at least one interface device, at least one processing device and at least one data store, wherein the interface device effects an integrated connection to at least one engineering tool and/or an integrated link to at least one engineering tool such that functionalities of the at least one interface device and of the at least one processing device can be retrieved from the respective engineering tool and carried out. The respective processing device, the respective interface device, and the respective engineering tool, elements created and/or marked by a first engineering tool can be transferred to the respective processing device and processed and/or can be made available on the at least one data store to be retrieved and/or to be transferred to and/or implemented in at least one second engineering tool.

13 Claims, 1 Drawing Sheet

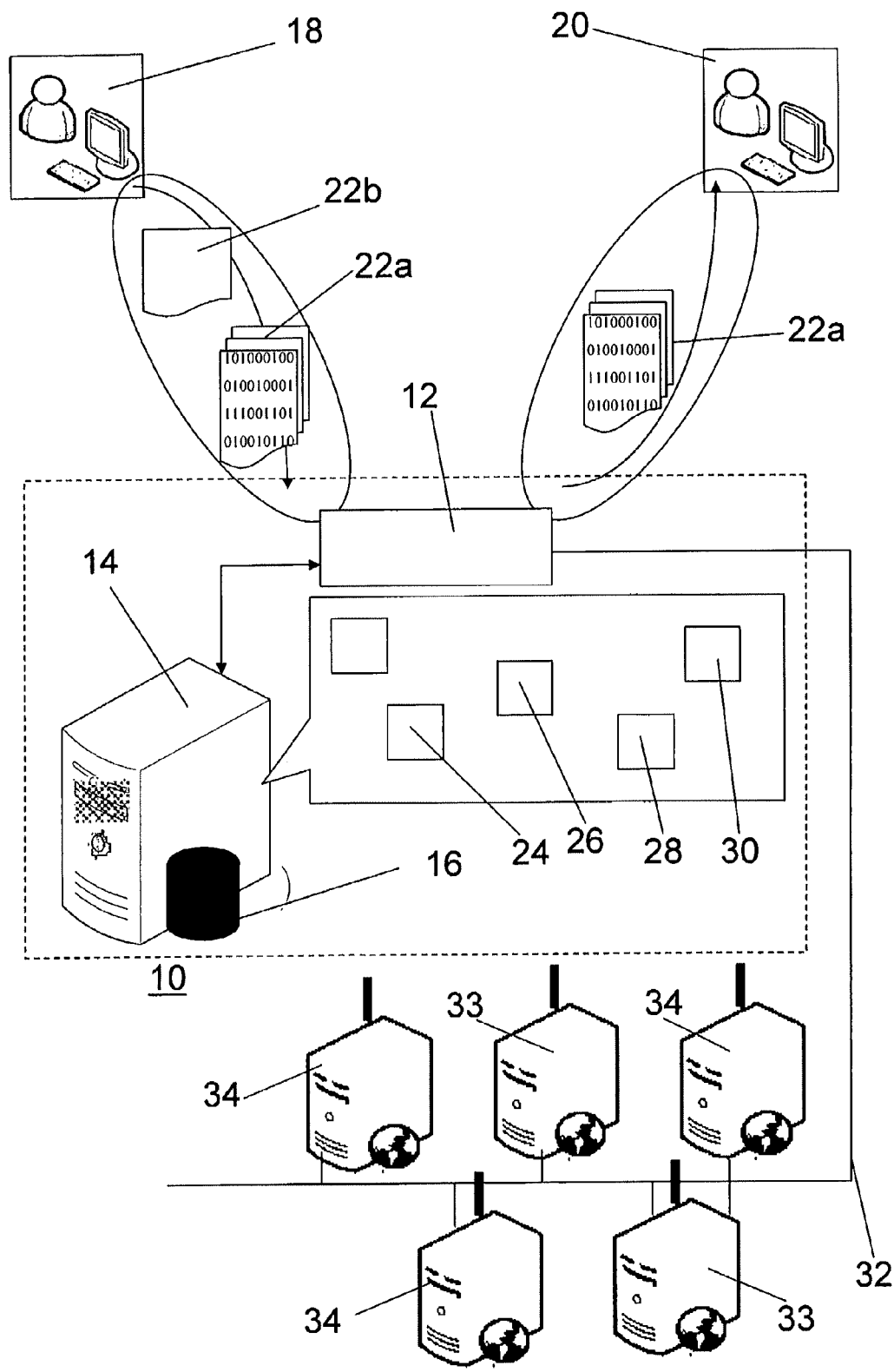

SYSTEM AND METHOD FOR DISTRIBUTING AND EXCHANGING ELEMENTS FOR PLANNING AND/OR FOR OPERATING AUTOMATION OPERATING EQUIPMENT

RELATED APPLICATION(S)

This application is the U.S. national stage under 35 U.S.C. §371 of PCT/EP2010/004602, filed as an International Application on Jul. 27, 2010 designating the U.S., the entire content of which is hereby incorporated by reference in its entirety.

FIELD

The disclosure relates to a system and a method for distributing and interchanging elements for the planning and/or operation of automation-engineering resources, for example, control logic elements for the engineering of automation-engineering resources.

BACKGROUND INFORMATION

Creation and implementation of control logic units or of control logic elements can be comparatively elaborate and difficult on account of the generally ever more complex tasks and increasing demands, including the requisite tests for operation, suitability, safety and reliability. In accordance with an exemplary embodiment, it would therefore be desirable for such elements to be interchanged and reused and/or used more than once.

Known methods and systems have afforded only limited and inadequate options in this regard to date.

Thus, at least two areas for the reuse of code elements are currently known. One is a method for producing and distributing libraries, and the other is "personal reuse" or individual, person-related reuse of solutions which have already been produced once, for example by "copy and paste".

The creation and maintenance or care of libraries can be very elaborate and subject to comparatively high costs. The setup and activation thereof in the respective organization or organization structure can be comparatively complex.

In the area of automation-engineering installations, the personal reuse of elements, for example, of logic elements, and hence also the "copy and paste" approach, can be used primarily when there are separate options for accessing such elements, for example, when the respective engineer has elements available from his own, earlier approaches to solutions and/or his own earlier projects for which it is known how they act and what they trigger.

Systematized and organized access to, for example, validated control logic elements for the planning and operation of automation-engineering resources has not been available with known systems and methods to date.

As a result, the disclosure provides an option for efficient and systematic interchange of, for example, control logic fragments and elements for the planning and operation of automation-engineering resources.

SUMMARY

A system is disclosed for distributing and interchanging elements for the planning and/or operation of automation-engineering resources comprising: at least one interface device; at least one processing device; and at least one data memory, wherein the at least one interface device is configured to prompt an integrative connection to at least one engineering tool and/or an integrative link to the at least one engineering tool, such that functionalities of the at least one interface device and of the at least one processing device will be called from the at least one engineering tool for execution, and wherein the at least one processing device in collaboration with the at least one interface device and the at least one engineering tool is configured to transfer elements that have been created from a first engineering tool and/or marked to the at least one processing device, and to process said elements and/or to make available said elements on the at least one data memory for retrieval and/or for transfer and/or implementation to/in at least one second engineering tool.

A method is also disclosed for distributing and interchanging elements for the planning and/or operation of automation-engineering resources, comprising: providing at least one integrative connection to at least one engineering tool and/or at least one integrative link to the at least one engineering tool; and providing elements that have been created from a first engineering tool and/or marked for further processing and for retrieval and/or for transfer and/or implementation to/in at least one second engineering tool.

BRIEF DESCRIPTION OF THE DRAWINGS

The disclosure is explained below with reference to the exemplary embodiments shown in the drawings. In the drawing:

FIG. 1 shows an exemplary system for distributing and interchanging elements, for example, for interchanging control logic elements, for the planning and/or operation of automation-engineering resources.

DETAILED DESCRIPTION

In accordance with an exemplary embodiment, a system for distributing and interchanging elements for the planning and/or operation of automation-engineering resources is disclosed. The system includes at least one interface device, at least one processing device and at least one data memory, wherein the interface device prompts an integrative connection to at least one engineering tool and/or an integrative link to at least one engineering tool, such that functionalities of the at least one interface device and also of the at least one processing device can be called from the respective engineering tool and executed, and wherein the respective processing device in collaboration with the respective interface device and the respective engineering tool can be used to transfer elements that have been created from a first engineering tool and/or marked to the respective processing device, and to process said elements and/or to make available said elements on the at least one data memory for the purpose of retrieval and/or for transfer and/or implementation to/in at least one further second engineering tool.

An exemplary embodiment of the aforementioned system and an appropriate method for performance on this system are specified in the following description.

According to the disclosure, the system for distributing and interchanging elements for the planning and/or operation of automation-engineering resources includes at least one interface device, at least one processing device and at least one data memory, wherein the interface device prompts an integrative connection to at least one engineering tool and/or an integrative link to at least one engineering tool, such that functionalities of the at least one interface device and also of the at least one processing device can be called from the respective engineering tool and executed, and wherein the processing device in collaboration with the interface device and the respective engineering tool can be used to transfer elements that have been created from a first engineering tool and/or marked to the respective processing device and to process said elements and/or to make available said elements on the at least one data memory for the purpose of retrieval and/or for transfer and/or implementation to/in at least one further second engineering tool.

In accordance with an exemplary embodiment, operation comprises the regulation and/or control and/or operator control and/or parameterization and/or observation of automation-engineering resources.

In accordance with another exemplary embodiment, the created and/or marked elements can be retrieved from the at least one data memory selectively and/or under user control and/or can be made available or provided for selective and/or automated transfer.

In accordance with an exemplary embodiment of the system, the elements comprise not only control logic elements and fragments but also complementary preconfigured data structures and/or information, for example, faceplates, or visual display images and/or graphics, and/or documentations and/or descriptions.

In a further exemplary embodiment of the system, at least one processing device comprises a processing tool which can be used to prompt and/or perform management, including user management and of the access rights, and/or conditioning and/or classification and/or prioritization and/or selective enabling of the transmitted elements and/or elements made available for retrieval and also of the remainder of the structures and information that can be made available.

In accordance with another exemplary embodiment of the system, at least one processing device has a categorization tool which can be used to prompt and/or perform assessment and/or categorization and/or denotation and/or adaptation of the transmitted elements.

In accordance with a further exemplary embodiment, the system provides that elements which have been transferred and/or set or made available can be denoted on the basis of function and/or purpose and/or the application options therefor and/or continued use thereof and/or enabling thereof can be limited or restricted on the basis of denotation.

In a further exemplary embodiment, it is provided that the categorization tool can be used to impress at least one terminating date and/or a period of time onto each element that can be made available, wherein the at least one terminating date indicates up until when and/or the period of time indicates when the element can be used and/or applied and/or retrieved, for example, in connection with enabling merely for test purposes but not for real application.

In accordance with a further exemplary embodiment, the aforementioned system allows the prompting and performance of systematic interchange and reuse and continued use of for example, program code elements and/or code fragments for the development and/or design of control logic units for the operation of automation-engineering resources and the making available thereof and the retrieval thereof from a data memory that is provided and set up for the purpose, for example, an appropriate database, and via a network that is set up for the purpose.

In accordance with another exemplary embodiment, at least one conditioning tool is provided which can be used to condition and/or generalize, for example, to convert into a standardized data structure, such as XML, the various elements, for example, the respective logic and/or program code fragments, before they are set or made available on the data memory.

In accordance with a further exemplary embodiment, the system can provide that the respective processing device in collaboration with the respective interface device and the respective engineering tool can be used to select and/or denote a plurality of elements directly in the first engineering tool and to group elements, for example, logic elements, that have been marked and denoted in this way automatically into objects and/or functional modules and, for example, in automated fashion, to transfer said elements to the processing device and to the at least one data memory and to make available said elements for further processing and/or distribution, for example, for retrieval and/or implementation in at least one further second engineering tool.

In another exemplary embodiment, at least one assessment tool is provided which can be used to prompt and/or perform assessment and/or annotation of the transmitted logic elements and/or code fragments, but also the remainder of the information, for example, on the basis of the problem on which they are based and/or the function which they perform.

In a further exemplary embodiment, the assessment tool allows the creation of a type of position table "ranking" for the transmitted elements, with the assessment being able to be carried out or performed using at least one predeterminable assessment scheme. For example, the respective assessment scheme can comprise and/or take account of one or more assessment criteria, the individual assessment criteria again being able to be weighted or prioritized in different ways. For example, when a plurality of reusable and/or selectable approaches to solutions have already been made available for a problem which differ in terms of individual criteria, such as speed of execution, complexity, memory requirement, variable and/or parameter management, flexibility and/or programming language, reliability, validity and/or safety, however. The ranking can be used to distinguish and accordingly select program elements and program code fragments which are for example, recommendable and less recommendable. The position table can reflect empirical data, for example, empirical values from previous users, for example, engineers, technicians and the like, for example.

Furthermore, a further exemplary embodiment allows references to be indicated, for example, historical and/or empirical data/information that can be stored with the respective fragment, for example where, when and to what extent the respective fragment has been used by whom for which purpose.

In another exemplary embodiment, the position table can also be used to provide a type of reward mechanism for the developer and/or provider of the respective information and/or of the respective logic element.

In a further exemplary embodiment, at least one processing device is provided which comprises a visual display tool which can be used to indicate and/or output status information relating to a respective element on a display device, for example, also in graphical form. For example, the at least one processing device can indicate and/or present status information, such as "Top 10 Percent contributor" and/or number of downloads or element retrievals and/or number of access operations.

In a further exemplary embodiment, the assessment tool can be used to capture and/or customize an annotation relating to an or a group of element(s) or fragment(s). For example, the respective annotation may also comprise description contents relating to the respective element.

In another exemplary embodiment, a further processing tool that can be provided is a search tool which can be used to search and/or investigate annotations and/or assessments for keywords and code words.

In addition, the system can provide that at least one communication device is provided which creates and/or makes available a virtual forum and/or an interchange platform for the exchange of views. For example, the interchange can be effected by using a network that is provided and set up for the purpose, for example, a control system or the Internet.

Additionally, in accordance with another exemplary embodiment, the system can provide that the assessment device makes available means, for example, appropriate masks with input fields, which allow a respective engineer to input or capture assessments and/or annotations in this regard.

In a further exemplary embodiment, the system can also provide means for assessing the comments and annotations that are set. For example, these comments could be used as a basis for a type of reward system for the developers and/or authors of the comments.

In another exemplary embodiment, the system can provide access means which can be used, when an element is set or is transferred to the processing device, to define access rights to this element in fine-grained fashion, for example, at the person making the setting, for example the developer, can actually define and/or indicate who is then permitted to download this element or fragment under what conditions or who is permitted and/or able to access it. Thus, the system can provide a use limitation, with the result that the availability of an element can be selectively limited in terms of scope, use, geographical readiness and user.

In a further exemplary embodiment, identification means for explicit system identification can be provided, with the result that when a logic element or fragment is intended to be retrieved via the system, this identification can be indicated and verified in advance.

In addition, in another exemplary embodiment, the system can provide that each element or fragment which is made available for retrieval is subject to information concerning that system identification and/or that application for which the respective element is licensed and hence enabled for implementation. For example, the respective receiving or implementing engineering and runtime system then ensures that only licensed components can be used.

In addition, in a further exemplary embodiment, the system can provide that when an element has been set or has been transferred to the system, it undergoes at least one checking step, with predeterminable checking criteria, for example, regarding quality, safety, reliability and operation, being stored for the check.

In addition, provision may also be made for the check to be performed in a plurality of steps, with the respective element first of all being checked superficially and being enabled for use for test purposes in the event of an appropriate result. A further, second, more thorough check is then performed, and only then is the respective element also enabled for production purposes in the event of a positive result. The aim of this approach is to make elements available at least as a test version or for test purposes as quickly as possible.

In another exemplary embodiment, a feedback option, for example a forum, can be provided for every single element and comprises or makes available means for obtaining fine-grained product feedback from the end customer or end user of the respective element and thereby improving the quality of the elements that are made available in a retrieval form for implementation and/or distribution.

The system can also provide a search tool which automatically searches predetermined sources, for example, accessible databases and/or the Internet, for updates and/or more recent versions of already known elements and/or new or alternative elements, for example, hitherto unknown or else unused elements, for example including planning modules or planning fragments, and indicates any hits found and makes them available for download and/or makes an appropriate request and/or makes available information in this regard, for example, hits information, in list form or in tabular form, for example.

In another exemplary embodiment, the search, for example, for new or alternative elements or fragments, is effected on the basis of the evaluation of specific project data from the base or the data or information memory of the respective engineering tool and/or on the basis of the respective user profile.

In a further exemplary embodiment, the system can contain means and/or has means made available which a respective system user himself or a system administrator with appropriate authorization can use to prescribe and capture the user profile of said system user.

For example, the respective profile can contain details and/or information relating to the area of use and/or the sector, for example whether a power station, a sewage treatment installation, a wind power installation, polymer production, a mill, a brewery, paper production, a painting line or the like is involved, and/or relating to at least one sought function or functionality, for example whether regulatory functions, control functions, monitoring functions, optimization functions, filter functions or the like and possibly a combination thereof are intended to be sought and implemented.

By contrast, the project data can be taken or extracted from specific projects, specific projects being understood to mean those projects which are already, at least partially, realized and/or implemented, and/or comprise all the elements imported on a system basis to date, for example, planning modules, demo modules and also modules which have been bought in or else licensed externally (externally to the system).

In addition, the system can provide that the search for updates and/or more recent versions of already known elements and/or new or alternative elements can be performed on the basis of a resource configuration for the respective user, which resource configuration can be prescribed to the system. The respective resource configuration, for example comprising type and number of resources, linkage and/or dependencies among one another, requisite or respectively used raw materials, auxiliaries and resources, utilization level and/or hours of operation and so forth, can be captured and/or stored as part of the respective user profile in this case.

In accordance with another exemplary embodiment, a method for distributing and interchanging elements for the planning and/or operation of automation-engineering resources, including for performance on the aforementioned system, wherein at least one integrative connection to at least one engineering tool and/or at least one integrative link to at least one engineering tool can be used to make available elements that have been created from a first engineering tool and/or marked for the purpose of further processing and for the purpose of retrieval and/or for transfer and/or implementation to/in at least one further second engineering tool is disclosed.

In accordance with a further exemplary embodiment, operation comprises the regulation and/or control and/or operator control and/or parameterization and/or observation of automation-engineering resources.

On the basis of the method, the method can provide that the created and/or marked elements can be retrieved selectively and/or under user control and/or are made available or provided for selective and/or automated transfer.

In one development of the method, the elements comprise not only control logic elements and fragments but also complementary preconfigured data structures and/or information, for example, faceplates, or visual display images and/or graphics, and/or documentations and/or descriptions.

In a further exemplary embodiment of the method, management, including user management and of the access rights, and/or conditioning and/or classification and/or prioritization and/or selective enabling of the elements that have been set or have been made available for transfer and/or retrieval and also of the remainder of the structures and information that can be made available, is prompted and/or performed.

In another exemplary embodiment, provision may be made for assessment and/or categorization and/or denotation and/or annotation of the respective transferable and/or set elements to be performed, for example, before they are transferred and/or made available.

In a further exemplary embodiment, the method can provide that elements which are transferable and/or have been set or made available are denoted on the basis of function and/or purpose and/or the application options therefor and/or continued use thereof and/or enabling thereof is limited or restricted on the basis of denotation.

In another exemplary embodiment, at least one terminating date and/or a period of time can be impressed onto an element that has been set and/or can be made available, wherein the at least one terminating date indicates up until when and the period of time indicates when the respective element can be used and/or applied and/or retrieved, for example, in connection with enabling merely for test purposes but not for the real, practical application.

In a further exemplary embodiment of the method, the method can prompt and perform systematic interchange and reuse and continued use of for example, program code elements and/or code fragments for the development and/or design of control logic units for the operation of automation-engineering resources and the making available thereof and the retrieval thereof via a network that is set up for the purpose.

In another exemplary embodiment, a plurality of elements can be selected and/or denoted directly in the first engineering tool, and elements that have been marked and denoted in this way, for example, logic elements, are automatically grouped into objects and/or functional modules and are made available, for example, in automated fashion, for further processing and/or distribution, for example, for retrieval and/or implementation in at least one further second engineering tool.

In a further exemplary embodiment, the method can prompt and/or perform assessment and/or annotation of the elements which can be transmitted and/or which have been set or made available, for example, the logic elements and/or code fragments, but also the remainder of the information, for example on the basis of the problem on which they are based and/or the function which they perform.

For example, the assessment can be performed using assessment criteria, the individual assessment criteria again being able to be weighted or prioritized in different ways.

The ranking can be used to distinguish and accordingly select elements, in particular program elements and program code fragments, which are for example, recommendable and less recommendable.

The position table therefore can reflect empirical data, for example, empirical values from previous users, for example, engineers, technicians and the like, for example.

In another exemplary embodiment, the status information relating to a respective element can be indicated and/or output on a display device, for example, also in graphical form.

In addition, when an element has been set or before said element has been transferred and/or made available it is checked—on the basis of the method—using predeterminable checking criteria, for example, regarding quality and/or safety and/or reliability for performance and function.

In addition, provision can also be made for the check to be performed in a plurality of steps, with the respective element first of all being checked superficially and being enabled for use for test purposes in the event of an appropriate result. A further, second, more thorough check can then performed, and only then is the respective element also enabled for production purposes in the event of a positive result. For example, in this case is to make elements available at least as a test version or for test purposes as quickly as possible.

In another exemplary embodiment of the method, the method can perform an automated or at least semi-automated search which searches predeterminable sources, for example, accessible databases and/or the Internet, for updates and/or more recent versions of already known elements and/or new or alternative elements, for example, hitherto unknown or else unused elements, for example including planning modules or planning fragments, and indicates any hits found and makes them available for download and/or makes an appropriate request and/or makes available information in this regard, for example, hits information.

For example, the search can be performed on the basis of the evaluation of specific project data from the base or the data or information memory of the respective engineering tool and/or on the basis of the respective user profile.

For example, the user profile of a respective user can be prescribed and captured by the user himself or a system or process administrator with appropriate authorization.

For example, the respective profile can contain details and/or information relating to the area of use and/or the sector, for example whether a power station, a sewage treatment installation, a wind power installation, polymer production, a mill, a brewery, paper production, a painting line or the like is involved, and/or relating to at least one sought function or functionality, for example whether regulatory functions, control functions, monitoring functions, optimization functions, filter functions or the like and possibly a combination thereof are intended to be sought and implemented.

By contrast, the project data can be taken or extracted from specific projects, specific projects being understood to mean those projects which are already, at least partially, realized and/or implemented, and/or comprise all the elements imported on a system basis to date, for example, planning modules, demo modules and also modules which have been bought in or else licensed externally (externally to the system).

In addition, the search for updates and/or more recent versions of already known elements and/or new or alternative elements can be performed on the basis of a prescribable resource configuration for the respective user. The respective resource configuration, for example comprising type and number of resources, linkage and/or dependencies among one another, requisite or respectively used raw materials, auxiliaries and resources, utilization level and/or hours of operation and so forth, can be captured and/or stored as part of the respective user profile in this case.

FIG. 1 shows a system in exemplary form for distributing and interchanging elements for the planning and/or operation of automation-engineering resources. Such interchange for the engineering of automation-engineering installation operations and process automation can be advantageous because the actual engineering, for example, the planning and/or design and/or development, can be made much more efficient by using components and elements which are already tried and tested.

In accordance with an exemplary system 10, the system 10 comprises an interface device 12, a processing device 14 and also a data memory 16, wherein the interface device 12 prompts an integrative connection to at least one first engineering tool 18 and a second engineering tool 20, such that functionalities of the interface device 12 and also of the processing device 14 can be called from the respective engineering tool 18, 20 and executed, and wherein the processing device 14 in collaboration with the interface device 12 and the respective engineering tool can be used to transfer elements 22a,b that have been created from the first engineering tool 18 and/or marked to the processing device 14 and to process said elements and/or to make available said elements on the data memory 16 for the purpose of retrieval and/or for transfer and/or implementation to/in the second engineering tool 20.

For example, the actual interchange process can be in essentially two method sections, an upload of the respective elements 22a,b from the first engineering tool 18 via the interface device 12 into the processing device 14 and onto the data memory 16, and a download from the data memory 16 or the processing device 14 onto the second engineering tool 20. In this case, the elements 22a,b may be any information, documentations, program code means, face plates and the like which is required for the operation, that is to say the regulation and/or control and/or operator control and/or parameterization and/or observation, of one or more automation-engineering resources.

The download of the created and/or marked elements 22a,b from the data memory 16 can be performed selectively and/or under user control, or the created and/or marked elements 22a,b can be made available for selective and/or automated transfer.

By way for example, the upload involves a control logic element that has been created in an engineering tool 18 being transferred to the processing device 14 via the system-compliant interface device 12 for the integrative connection of an engineering tool 18, 20, wherein a plurality of checking steps can be undergone which, by way of example, are intended to check whether the respective element 22a,b is enabled generally or is enabled in limited fashion for merely internal use. The quality of the respective element and/or the identity of the creator or user are also checked. For example, if the check proceeds successfully, the relevant element 22a,b can be made available on a data memory for retrieval by a second engineering tool 20 and for implementation for a production process.

If the quality check does not yield a sufficiently positive result, the element can also be enabled merely for evaluation or test purposes.

Depending on specifications, in accordance with an exemplary embodiment, two versions can be stored for an element 22a,b one for evaluation purposes and one for production, for example, and to be provided for retrieval, with the element being respectively enabled and forwarded to a respective second engineering tool 20 on the basis of requirements and/or request.

For example, the interface device 12 can use current concepts such as web services, for example, to set up an integrative connection to the respective engineering tool 18, 20.

In accordance with an exemplary embodiment, integrative can be understood to mean that functions of the system 10 and for example, of the processing device 14 but also of the interface device 12 can be called directly from the respectively connected engineering tool 18, 20 and used.

Thus, the respective web service can be used to create and implement a type of "Add On", for example, in the form of a menu and/or a function line in the respective engineering tool 18, 20, said add on then being able to be used to call and/or perform appropriate system functions.

The processing device 14 can have a processing tool 24 which can be used to prompt and/or perform management of the users and of the access rights and also conditioning and classification and finally also selective enabling of the elements that have been transmitted and/or made available for retrieval and also of the remainder of the structures and information that can be made available.

In addition, a categorization tool 26 can be provided which is used to prompt and perform assessment and/or categorization and/or denotation and/or annotation of the transmitted elements. In accordance with an exemplary embodiment, the aim of this assessment may be to indicate empirical values with the respective element, for example, where used, when used, in what context (area of application) used and with what actual effect or result. Alternatively, it may involve how the respective element was to handle. For the most objective assessment possible, assessment criteria in this regard can be predetermined.

This tool can also be used to denote the elements which have been transferred and/or set or made available on the basis of function and/or purpose and to limit the application options therefor and/or reuse thereof and/or enabling thereof on the basis of denotation.

Furthermore, the categorization tool 26 can be used to impress at least one terminating date and/or a period of time onto each element 22a,b that can be made available, wherein the at least one terminating date indicates up until when and the period of time indicates when the element can be used and/or applied and/or retrieved, for example, in connection with enabling merely for test purposes but not for real application.

In addition, the processing device 14 comprises a visual display tool 28 which can be used to indicate and/or output status information relating to a respective element on a display device, for example, also in graphical form.

In another exemplary embodiment, a further processing tool which can be provided is a search tool 30 which can be used as part of an internal search to search and/or investigate elements 22a,b that have been transferred to the system 10, for example, comments and/or assessments, for, keywords and code words. Furthermore, the search tool 30 can also be used to form an external search, for example for updates and/or elements with specific functionalities and/or instructions and/or comments, in predeterminable data sources, for example, in relevant databases 32, including customer databases 33, and/or networks, such as the World Wide Web and/or the Internet 34 and/or an intranet, using key words and code words.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for distributing and interchanging elements for a planning or an operation of automation-engineering resources comprising:
   at least one interface device;
   at least one processing device;
   at least one data memory, wherein the at least one interface device is configured to prompt an integrative connection to at least one engineering tool or an integrative link to the at least one engineering tool, such that functionalities of the at least one interface device and of the at least one processing device will be called from the at least one engineering tool for execution, and wherein the at least one processing device in collaboration with the at least one interface device and the at least one engineering tool is configured to transfer elements that have been created from a first engineering tool or marked to the at least one processing device, and to process said elements or to make available said elements on the at least one data memory for retrieval in, for transfer to, or implementation in at least one second engineering tool;
   wherein the at least one processing device comprises a categorization tool for performing assessment or denotation of transferred elements, and wherein the elements which have been transferred are limited or restricted on the basis of denotation;
   when an element has been set or has been transferred to the system, at least one checking step with predetermined checking criteria is performed, the predetermined checking criteria including quality, safety, reliability, and operation, and the predetermined checking criteria being stored in memory for the check; and
   wherein the element is first checked for test purposes in a first test check, and wherein in an event of a positive result from the first test check, the element is enabled for use for test purposes, and then performing a second production check on the respective element, and only then is the respective element enabled for production purposes in the event of a positive result from the second production check.

2. The system as claimed in claim 1, comprising:
   automation-engineering resources, wherein the operation includes regulation or control or operator control or parameterization or observation of the automation-engineering resources.

3. The system as claimed in claim 1, wherein the at least one processing device is configured to retrieve the created or marked elements from the at least one data memory selectively or under user control or the elements are available or provided for selective or automated transfer.

4. The system as claimed in claim 1, wherein the elements comprise:
   control logic elements and fragments, and complementary preconfigured data structures or information.

5. The system as claimed in claim 4, wherein the preconfigured data structures or information are faceplates, visual display images or graphics.

6. The system as claimed in claim 1, wherein the at least one processing device comprises:
   a processing tool for prompting or performing management or user management of access rights, or conditioning or classification or prioritization or selective enabling of transferred elements or elements that are available for retrieval or a remainder of structures and information that are available.

7. The system as claimed in claim 1, wherein the at least one processing device in collaboration with the at least one interface device and the at least one engineering tool are configured to select or denote a plurality of elements directly in the first engineering tool and to group elements that have been marked and denoted in this way automatically into objects or functional modules and to transfer said elements to the at least one processing device and to the at least one data memory and to make available said elements for further processing or distribution.

8. The system as claimed in claim 1, comprising:
   a visual display tool for indicating or outputting status information relating to a respective element on a display device.

9. The system as claimed in claim 1, comprising:
   at least one communication device for creating or making available a virtual forum an interchange platform for an exchange of views.

10. A system for distributing and interchanging elements for a planning or an operation of automation-engineering resources comprising:
    at least one interface device;
    at least one processing device;
    at least one data memory, wherein the at least one interface device is configured to prompt an integrative connection to at least one engineering tool or an integrative link to the at least one engineering tool, such that functionalities of the at least one interface device and of the at least one processing device will be called from the at least one engineering tool for execution, and wherein the at least one processing device in collaboration with the at least one interface device and the at least one engineering tool is configured to transfer elements that have been created from a first engineering tool or marked to the at least one processing device, and to process said elements or to make available said elements on the at least one data memory for retrieval in, for transfer to, or implementation in at least one second engineering tool;
    wherein the at least one processing device comprises a categorization tool for performing assessment or denotation of transferred elements, and wherein the elements which have been transferred are limited or restricted on the basis of denotation;
    when an element has been set or has been transferred to the system, at least one checking step with predetermined checking criteria is performed, the predetermined checking criteria including quality, safety, reliability, and operation, and the predetermined checking criteria being stored in memory for the check;

wherein the element is first checked for test purposes in a first test check, and wherein in an event of a positive result from the first test check, the element is enabled for use for test purposes, and then performing a second production check on the respective element, and only then is the respective element enabled for production purposes in the event of a positive result from the second production check; and wherein the categorization tool is configured to impress at least one terminating date or a period of time onto each element that is made available, and wherein the at least one terminating date will indicate up until when, and the period of time will indicate when the element is used or applied or retrieved.

11. A method for distributing and interchanging elements for a planning or an operation of automation-engineering resources, comprising:

providing at least one integrative connection to at least one engineering tool or at least one integrative link to the at least one engineering tool;

providing elements that have been created from a first engineering tool or marked for further processing and for retrieval in, for transfer to, or implementation in at least one second engineering tool;

wherein the method is performed on a system for distributing and interchanging elements for a planning or an operation of automation-engineering resources comprising:

at least one interface device;
at least one processing device;
and at least one data memory, wherein the at least one interface device is configured to prompt an integrative connection to at least one engineering tool or an integrative link to the at least one engineering tool, such that functionalities of the at least one interface device and of the at least one processing device will be called from the at least one engineering tool for execution, and wherein the at least one processing device in collaboration with the at least one interface device and the at least one engineering tool is configured to transfer elements that have been created from a first engineering tool or marked to the at least one processing device, and to process said elements or to make available said elements on the at least one data memory for retrieval in, for transfer to, or implementation in at least one second engineering tool;

wherein the at least one processing device comprises a categorization tool for performing assessment or denotation of transferred elements, and wherein the elements which have been transferred are limited or restricted on the basis of denotation;

when an element has been set or has been transferred to the system, at least one checking step with predetermined checking criteria is performed, the predetermined checking criteria including quality, safety, reliability, and operation, and the predetermined checking criteria being stored in memory for the check; and wherein the element is first checked for test purposes in a first test check, and wherein in an event of a positive result from the first test check, the element is enabled for use for test purposes, and then performing a second production check on the respective element, and only then is the respective element enabled for production purposes in the event of a positive result from the second production check.

12. The method as claimed in claim 11, wherein the operation comprises a regulation or control or operator control or parameterization or observation of automation-engineering resources.

13. The method as claimed in claim 11, wherein the created or marked elements are retrieved selectively or under user control or are made available or provided for selective or automated transfer.

\* \* \* \* \*